(12) United States Patent
Gill et al.

(10) Patent No.: US 7,002,724 B2
(45) Date of Patent: Feb. 21, 2006

(54) APPARATUS AND METHOD FOR GENERATING A 90° ALTERNATE PHASE OPTICAL PULSETRAIN

(75) Inventors: Douglas M. Gill, South Orange, NJ (US); Christi K. Madsen, South Plainfield, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/874,594

(22) Filed: Jun. 23, 2004

(65) Prior Publication Data

US 2005/0286109 A1 Dec. 29, 2005

(51) Int. Cl.
  *G02F 1/01* (2006.01)
  *G02F 1/035* (2006.01)
  *H04B 10/04* (2006.01)
(52) U.S. Cl. .......................... 359/279; 385/3; 398/188
(58) Field of Classification Search ................ 359/279; 385/3; 398/188
  See application file for complete search history.

(56) References Cited

U.S. PATENT DOCUMENTS 6,760,142 B1 * 7/2004 Leuthold et al. ............ 359/279
6,842,125 B1 * 1/2005 Mauro et al. ................. 341/69

OTHER PUBLICATIONS

A co-pending U.S. Appl. No. 10/099,077, filed Mar. 14, 2002, to Gill, et al., entitled "High-Bit-Rate Long-Haul Fiber Optic Communication System Techniques and Arrangements"; Currently Pending.

* cited by examiner

*Primary Examiner*—Georgia Epps
*Assistant Examiner*—William Choi

(57) ABSTRACT

Various apparatus and methods for generating a 90° AP optical pulsetrain. In one embodiment, the apparatus includes: (1) a phase-modulated optical signal generator configured to generate a phase-modulated optical signal having a carrier band and sidebands phase-shifted relative thereto by multiples of 90° and (2) an optical filter coupled to the phase-modulated optical signal generator and configured to 180° phase-shift selected ones of the carrier band and sidebands to generate the 90° AP optical pulsetrain.

20 Claims, 6 Drawing Sheets

APPARATUS AND METHOD FOR GENERATING A 90° ALTERNATE PHASE OPTICAL PULSETRAIN

TECHNICAL FIELD OF THE INVENTION

The present invention is directed, in general, to optical communication systems and, more specifically, to an apparatus and method for generating a 90° alternate phase (AP) optical pulsetrain.

BACKGROUND OF THE INVENTION

High-capacity long-haul transmission at low cost is of crucial importance to meet the ever-increasing demand in optical communications. Designing long-haul (e.g., designed for distances in excess of 1000 km) dense wavelength-division-multiplexed (DWDM) systems is a means to achieve high capacity and low cost. However, many of the current high bit rate (e.g., with data rates of 40 Gb/s) DWDM systems use a pseudo-linear transmission format, called return-to-zero (RZ) on-off keying (OOK) transmission, in which the presence or absence of light conveys information, e.g., a digital "one" is represented by the presence of an optical pulse and a "zero" is represented by the absence of a pulse. These systems suffer from various non-linear transmission penalties, such as intra-channel cross-phase modulation (XPM) and intra-channel four wave mixing (FWM), the latter of which results in the amplitude fluctuation in "is" and the generation of ghost pulses through energy transfers from "1s" to "0s." These effects undesirably limit the ultimate reach of the system.

While intra-channel XPM can be effectively suppressed by optimum dispersion management, intra-channel FWM remains a limiting nonlinear penalty in long-haul high-bit-rate transmission, despite various attempts that have been made to deal with that effect. For example, different signaling or modulation formats, such as return to zero (RZ), carrier-suppressed RZ (CS-RZ), chirped RZ (C-RZ), modified duo-binary, etc., have been suggested. Unfortunately, however, these attempts have not met realistic commercial needs, due, in part to problems associated not just with performance limitations, but also with expense, and implementation difficulty. For example, one approach to suppressing ghost pulse generation is to use duobinary and modified duobinary formats. However, that approach is not optimal, because the implementation of these transmission formats generally requires either complicated electronics or extra optical component hardware on the transmitter side of the transmission link.

Accordingly, what is needed in the art is a new optical transmission format that reduces the effects of intra-channel FWM. What is further needed in the art is a new optical pulse generator for generating pulses according to the new transmission format.

SUMMARY OF THE INVENTION

A co-pending U.S. patent application Ser. No. 10/099,077, filed Mar. 14, 2002, to Gill, et al., entitled "High-Bit-Rate Long-Haul Fiber Optic Communication System Techniques and Arrangements," incorporated herein by reference, introduces a novel 90° AP on-off keying (OOK) transmission format to suppress intra-channel FWM and significantly extend reach in high bit rate, long-haul fiber optic transmission systems. According to Gill, et al., the 90° AP pulse train may be created with a pulse generator by using two electrical signals to create intensity and phase modulations in the pulse generator. An optical pulsetrain is thereby created in which the maximum optical phase modulation preferably occurs at the intensity peak of each pulse and is 90° out of phase with its nearest neighbors. The present invention further addresses the deficiencies of the prior art described in the above Background of the Invention section by introducing a novel optical pulse generator that generates a 90° AP optical pulsetrain according to the new transmission format. The novel optical pulse generator is simpler and more power-efficient than a pulse generator driven at a 33% duty cycle to produce a 90° AP optical pulsetrain.

In one aspect, the present invention provides an apparatus for generating a 90° AP optical pulsetrain. In one embodiment, the apparatus includes: (1) a phase-modulated optical signal generator configured to generate a phase-modulated optical signal having a carrier band and sidebands phase-shifted relative thereto by multiples of 90° and (2) an optical filter coupled to the phase-modulated optical signal generator and configured to 180° phase-shift selected ones of the carrier band and sidebands to generate the 90° AP optical pulsetrain.

In another aspect, the present invention provides a method of generating a 90° AP optical pulsetrain. In one embodiment, the method includes: (1) generating a phase-modulated optical signal having a carrier band and sidebands phase-shifted relative thereto by multiples of 90° and (2) 180° phase-shifting selected ones of the carrier band and sidebands.

In yet another aspect, the present invention provides an apparatus for generating a 90° AP optical pulsetrain. In one embodiment, the apparatus includes: (1) a phase-modulated optical signal generator including an electro-optical phase modulator, the phase-modulated optical signal generator configured to generate a phase-modulated optical signal having a carrier band and sidebands phase-shifted relative thereto by multiples of 90° and (2) an optical filter coupled to the phase-modulated optical signal generator and configured to 180° phase-shift selected ones of the carrier band and sidebands to generate an 90° AP optical pulsetrain having a pulse frequency of about 40 GHz.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
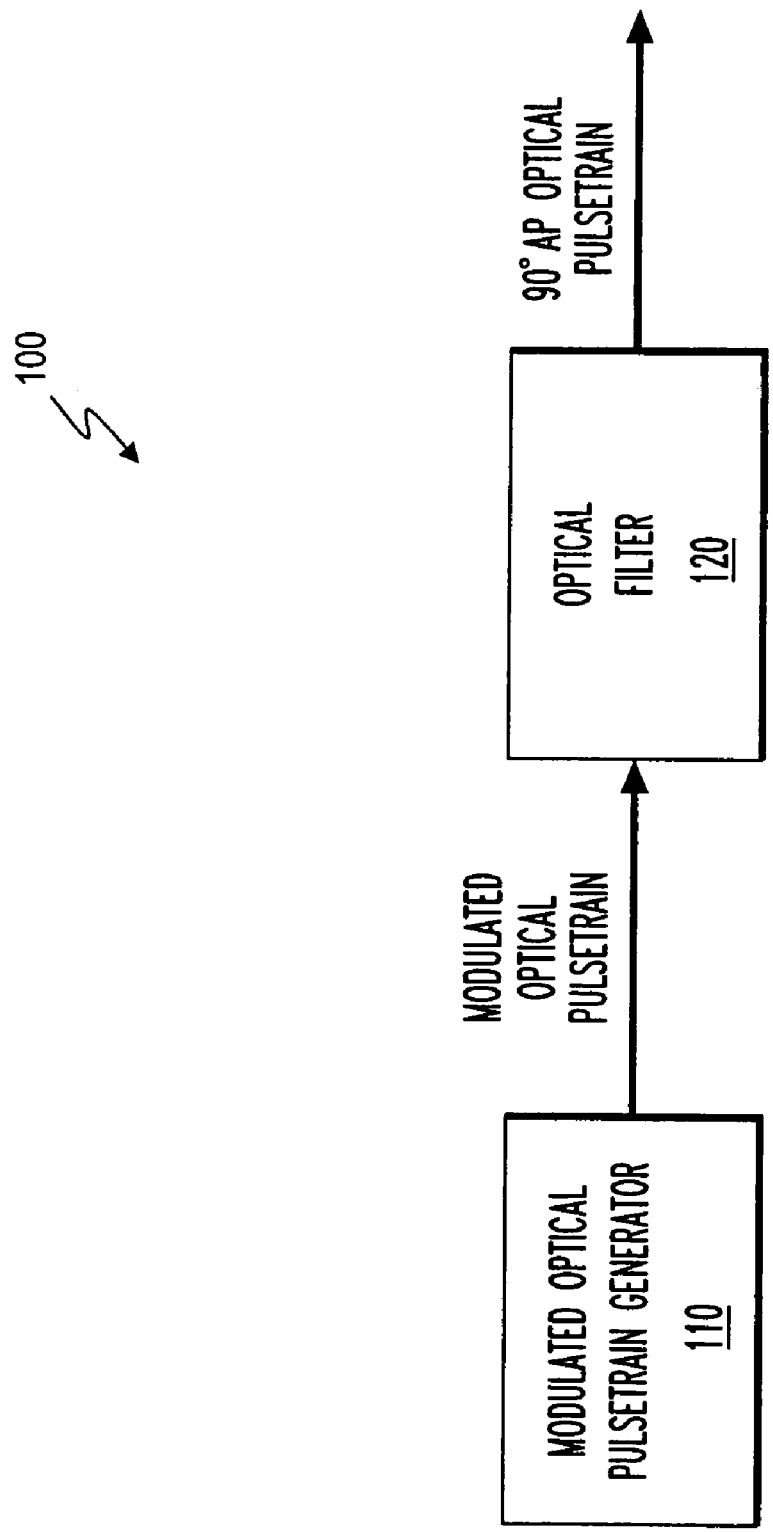
FIG. 1 illustrates a schematic diagram of one embodiment of an apparatus for generating a 90° AP optical signal constructed according to the principles of the present invention.

Referring initially to FIG. 1, illustrated is a schematic diagram of one embodiment of an apparatus, generally designated 100, for generating a 90° AP optical pulsetrain constructed according to the principles of the present invention. The apparatus 100 includes a phase-modulated optical signal generator 110. The phase-modulated optical signal generator 110 is configured to generate a phase-modulated optical signal having a carrier band and sidebands phase-shifted relative thereto by multiples of 90°. As will be described more thoroughly below, the phase-modulated optical signal generator 110 may take the form of an electro-optical phase modulator driven at half a desired pulse frequency of the 90° AP optical pulsetrain. Alternatively, the phase-modulated optical signal generator 110 may take the form of a modulated laser light source.

In the illustrated embodiment, the 90° AP optical pulsetrain has a pulse frequency of about 40 GHz. Thus, the phase-modulated optical signal generator 110 is driven at about 20 GHz, which is about half the 40 GHz pulse frequency. Those skilled in the pertinent art will understand, however, that the broad scope of the present invention is not limited to a particular pulse frequency or drive rate.

The apparatus 100 further includes an optical filter 120. The optical filter 120 is coupled to the output of the phase-modulated optical signal generator 110 to receive the phase-modulated optical signal. The optical filter 120 is configured to 180° phase-shift selected ones of the carrier band and sidebands to generate the 90° AP optical pulsetrain. As will be described more thoroughly below, the optical filter 120 may take the form of an all-pass filter having at least one stage. Alternatively, the optical filter 120 may take the form of at least one Fabry-Perot filter. In the illustrated embodiment, the optical filter 120 has a free spectral range (FSR) at least three times a spacing of the carrier band and sidebands. For example, if the carrier band and sidebands are spaced 20 GHz apart, the optical filter 120 has an FSR of at least 60 GHz.

As will be seen, the optical filter 120 may 180° phase-shift either the carrier band or, alternatively, at least two of the sidebands. In one embodiment, the optical filter 120 phase-shifts all the sidebands.

Figure 2A:
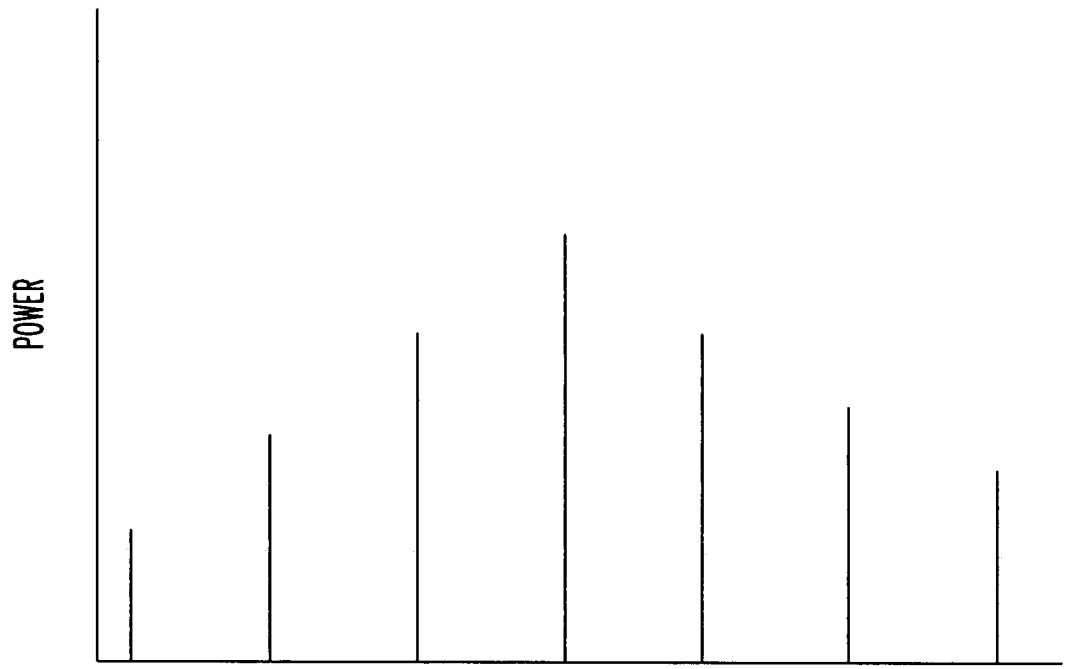
FIGS. 2A and 2B together graphically illustrate the output power spectrum and phases of a carrier band and sidebands phase-shifted relative thereto by multiples of 90° as generated by an electro-optical phase modulator driven at 20 GHz.
Figure 2B:
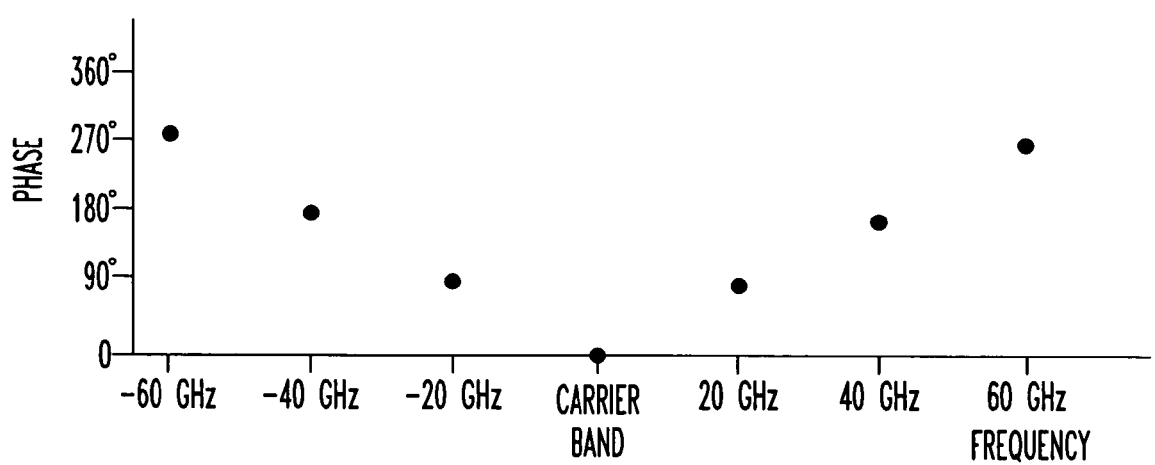

Turning now to FIGS. 2A and 2B, graphically illustrated are the output power spectrum (FIG. 2A) and phases (FIG. 2B) of a carrier band and sidebands phase-shifted relative thereto by multiples of 90° as generated by an electro-optical phase modulator driven at 20 GHz. A carrier band is evident, as well as ±20 GHz, +40 GHz and ±60 GHz sidebands.

The spectral content of the output of an electro-optic phase modulator driven to yield a 180°±50° phase shift at a frequency of 20 GHz (or so) contains the same frequency components as a prior art 33% duty cycle 90° AP pulse generator. However, FIG. 2B demonstrates that the phase relationships are different. (Closed circles represent the phases in FIG. 2B and subsequent FIGUREs.) While not illustrated, the intensities of the bands are also different. Because the phase and intensity relationships are inappropriate, the output of an electo-optic phase modulator is, by itself, insufficient to produce a suitable 90° AP optical pulsetrain.

If, however, the relative phase of the 40 GHz and 60 GHz sidebands from the phase modulator are shifted by 180°, the relative phase of the output of the phase modulator spectral components will be suitable. Even though the relative powers of the sidebands in the output of the phase modulator are not identical to that of a 33% duty cycle 90° AP pulse generator, modifying the phase of the 40 GHz and 60 GHz sidebands results in a good extinction ratio optical pulsetrain with a 90° AP shift between neighboring pulses.

If only the 40 GHz sidebands are phase-shifted by 180° at the output of the phase modulator, the result is still a reasonable 90° AP optical pulsetrain. This further simplifies the design of a given filter used to realize this pulse generator.

Figure 3A:
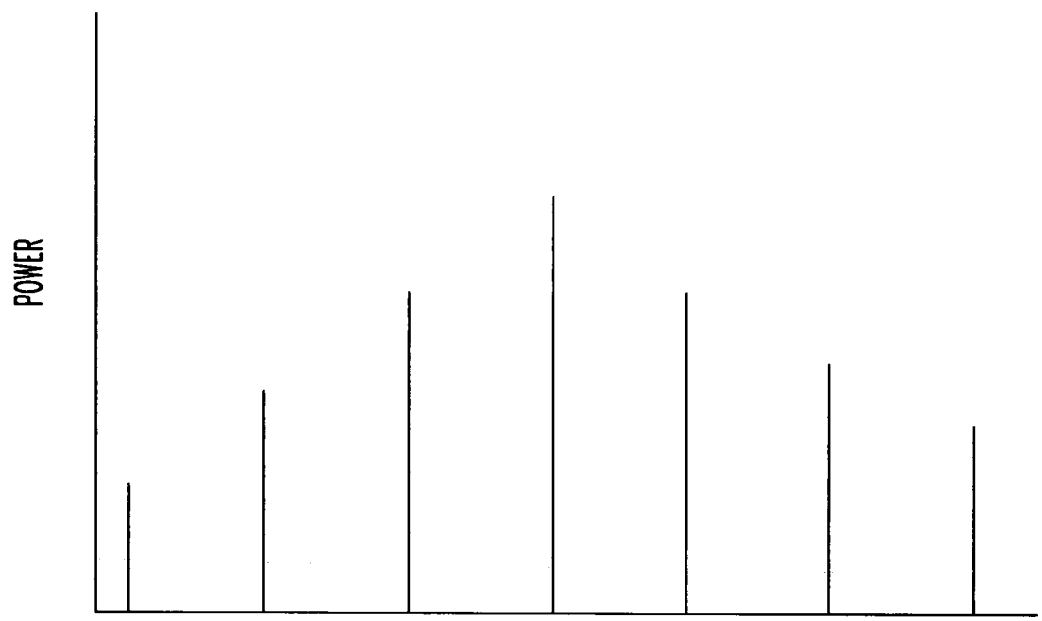
FIGS. 3A and 3B together graphically illustrate the power spectrum and phases resulting from a 180° phase-shift of the carrier band of FIGS. 2A and 2B.
Figure 3B:
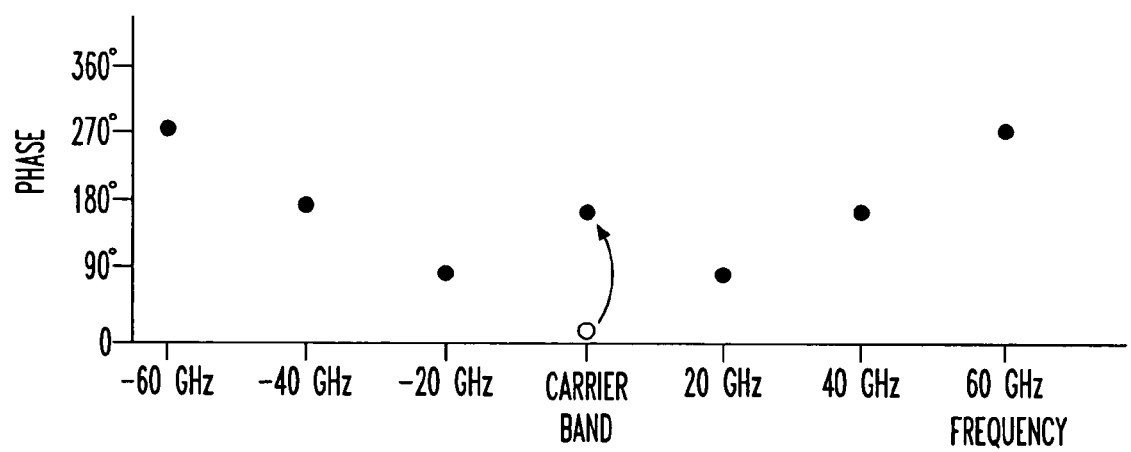

If only the carrier sideband from the output of the phase modulator is shifted by 180° and no other sidebands are shifted, the output of the phase modulator and phase-shifting optical filter will also be a 90° AP optical pulsetrain. FIGS. 3A and 3B graphically illustrate the resulting power spectrum and phases. With respect to phases in FIG. 3B and subsequent FIGUREs, open circles designate the phases prior to shift, and arrows designate the shift.

Figure 4A:
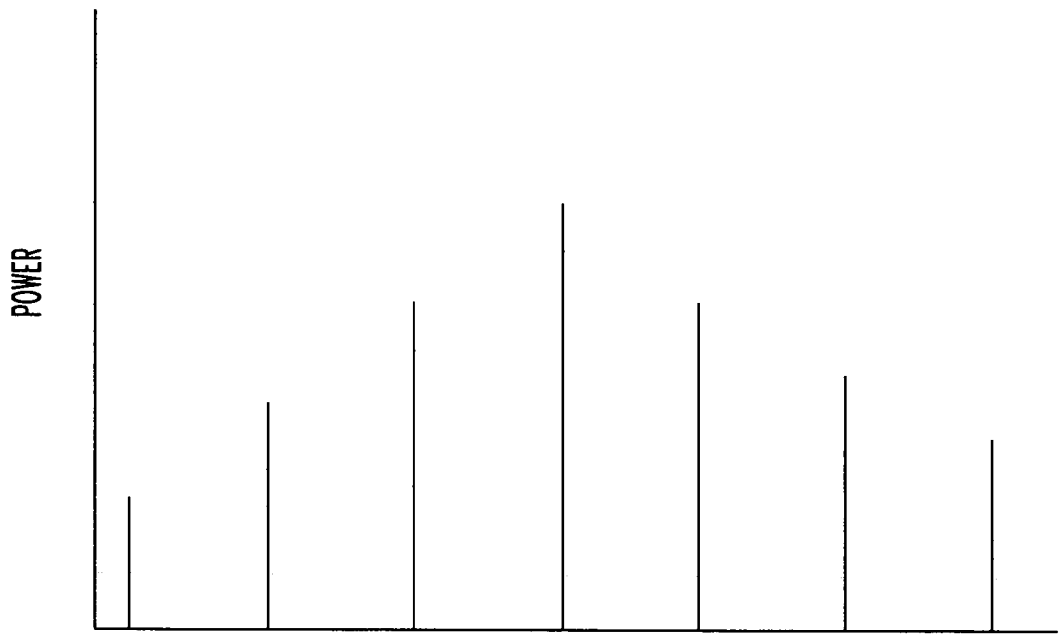
FIGS. 4A and 4B together graphically illustrate the power spectrum and phases resulting from a 180° phase-shift of selected ones of the sidebands of FIGS. 2A and 2B.
Figure 4B:
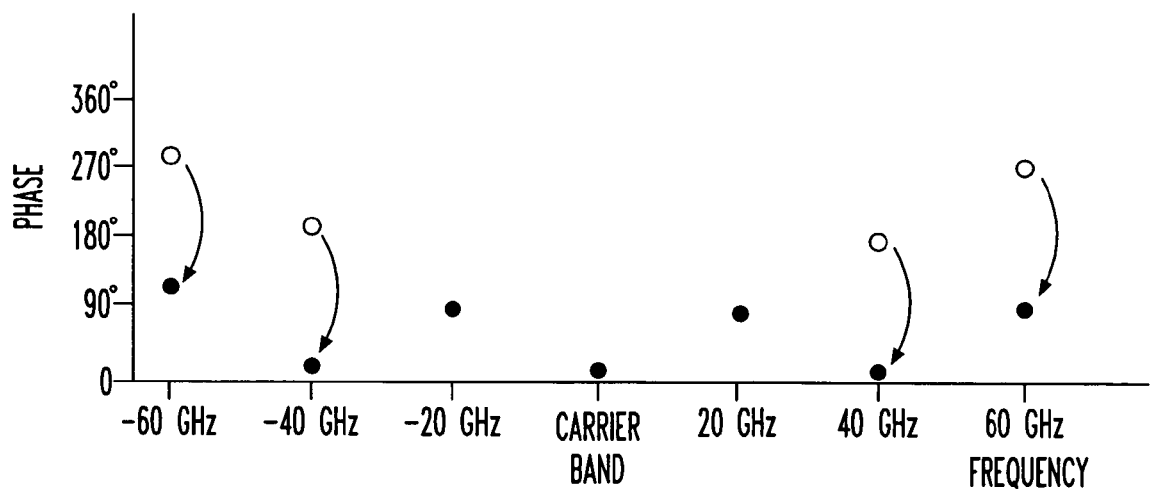

If only the carrier frequency is shifted by 180°, or alternately all sidebands are shifted by 180° except the carrier, then a good 90° AP optical pulsetrain will result. FIGS. 4A and 4B graphically illustrate the power spectrum and phases resulting from a 180° phase-shift of selected ones of the sidebands of FIGS. 2A and 2B. If either scenario outlined above is realized, then a 90° AP optical pulsetrain results.

Figure 5A:
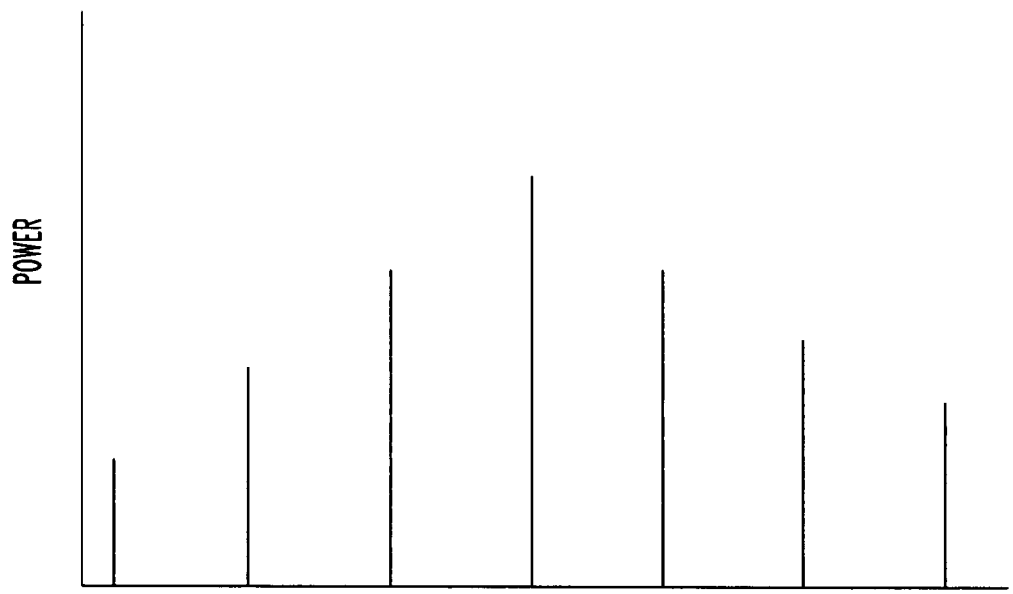
FIGS. 5A and 5B together graphically illustrate the power spectrum and phases resulting from a 180° phase-shift of all of the sidebands of FIGS. 2A and 2B.
Figure 5B:
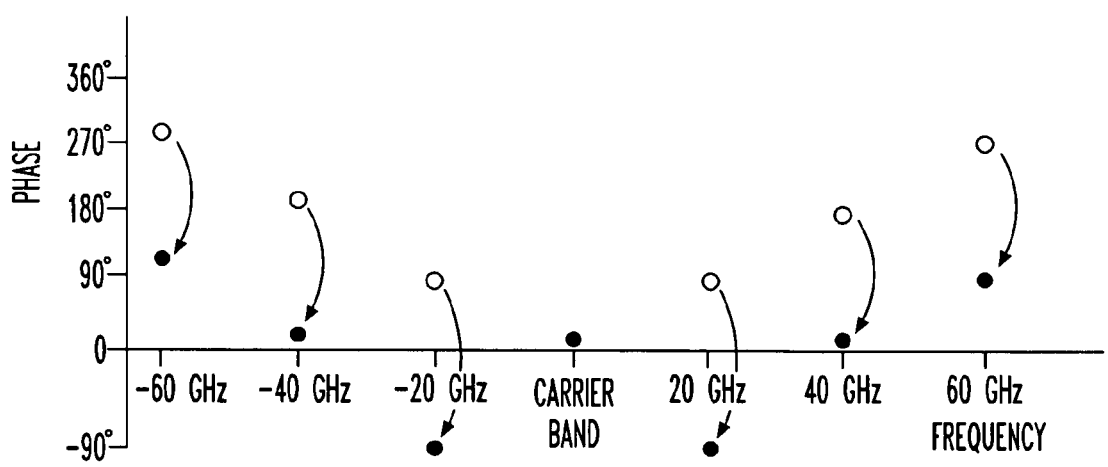

Turning now to FIGS. 5A and 5B, graphically illustrated are the power spectrum and phases resulting from a 180° phase-shift of all of the sidebands of FIGS. 2A and 2B. An all-pass filter can shift the phase of all sidebands relative to the carrier band, if configured properly. Alternatively, a single Fabry-Perot filter, or cascaded multiple Fabry-Perot filters, can also shift the relative phase of selected sidebands.

Those skilled in the pertinent art understand, however, that all-pass filters tend to exhibit more loss than Fabry-Perot filters. Those skilled in the pertinent art will realize that many other filters can be used to create a modification of the relative phase and magnitude of the output of the phase modulator, and could be appropriately applied in conjunction with an appropriate amount of phase modulation to form the desired spectral content and relative phase to realize a 90° AP optical pulsetrain.

An alternative embodiment of the present invention employs an optical filter that modifies the phase of the phase-modulated optical signal without substantially modifying its spectral content. The optical filter is a two-stage all-pass filter including an optical waveguide having two ring resonators proximate the waveguide. Coupling regions interposing the waveguide and two ring resonators provide the necessary phase-shifting. The two-stage all-pass filter advantageously further includes a Mach-Zehnder interferometer to aid in tuning its spectral response.

The specific design that would achieve the desired filter response has a p=0.7321 and an FSR equal to three times the spacing of the various bands in the pulsetrain. The two-stage all-pass filter advantageously changes the relative phase of the ±20 GHz and ±40 GHz sidebands by 180°, but does not change the relative phase of the carrier band or the ±60 GHz sidebands. Modeling indicates that this is sufficient to create a suitable 90° AP optical pulsetrain.

A modulated laser light source could be used in lieu of the phase modulator to create the phase-modulated optical signal for the optical filter. However, the relative phases of the output sidebands of the modulated laser light source may need to be modified appropriately to create the proper intensity and phase relationship to result in a 90° AP optical pulsetrain. Namely, the ±20 GHz and ±60 GHz sidebands need to be shifted by 90°. The optical filter can be modified to perform the required 90° phase-shifts and yield a suitable 90° AP optical pulsetrain. The multimode laser should advantageously exhibit phase stability among its various bands.

Figure 6:
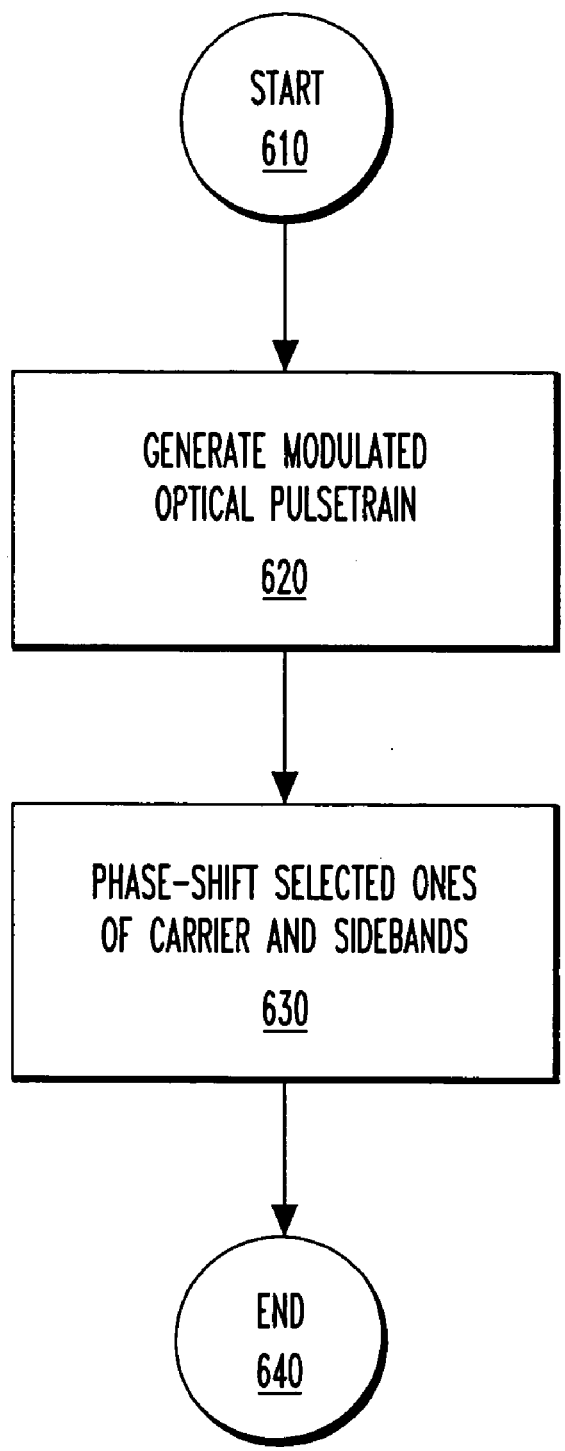
FIG. 6 illustrates a flow diagram of one embodiment of a method of generating a 90° AP optical signal carried out according to the principles of the present invention.

Turning now to FIG. 6, illustrated is a flow diagram of one embodiment of a method of generating a 90° AP optical pulsetrain carried out according to the principles of the present invention. The method begins in a start step 610 in which it is desired to generate a 90° AP optical pulsetrain. The method proceeds to a step 620 in which a phase-modulated optical signal having a carrier band and sidebands phase-shifted relative thereto by multiples of 90° is generated. Then, in a step 630, selected ones of the carrier band and sidebands are 180° phase-shifted to yield the 90° AP optical pulsetrain. In alternative embodiments, the carrier band can be 180° phase-shifted, fewer than all of the sidebands can be 180° phase-shifted, or all of the sidebands can be 180° phase-shifted relative to the carrier band. The method ends in an end step 640.

Although the present invention has been described in detail, those skilled in the art should understand that they can make various changes, substitutions and alterations herein without departing from the spirit and scope of the invention in its broadest form.

What is claimed is:

1. An apparatus for generating a 90° alternate phase (AP) optical pulsetrain, comprising:
   a phase-modulated optical signal generator configured to generate a phase-modulated optical signal having a carrier band and sidebands phase-shifted relative thereto by multiples of 90°; and
   an optical filter coupled to said phase-modulated optical signal generator and configured to 180° phase-shift selected ones of said carrier band and sidebands to generate said 90° AP optical pulsetrain.

2. The apparatus as recited in claim 1 wherein said phase-modulated optical signal generator comprises an electro-optical phase modulator driven at half a desired pulse frequency of said 90° AP optical pulsetrain.

3. The apparatus as recited in claim 1 wherein said phase-modulated optical signal generator is a modulated laser light source.

4. The apparatus as recited in claim 1 wherein said optical filter is an all-pass filter having at least one stage.

5. The apparatus as recited in claim 1 wherein said optical filter is at least one Fabry-Perot filter.

6. The apparatus as recited in claim 1 wherein said optical filter 180° phase-shifts either said carrier band or at least two of said sidebands and has a free spectral range at least three times a spacing of said carrier band and sidebands.

7. The apparatus as recited in claim 1 wherein said 90° AP optical pulsetrain has a pulse frequency of about 40 GHz.

8. A method of generating a 90° alternate phase (AP) optical pulsetrain, comprising:
   generating a phase-modulated optical signal having a carrier band and sidebands phase-shifted relative thereto by multiples of 90°; and
   180° phase-shifting selected ones of said carrier band and sidebands.

9. The method as recited in claim 8 wherein said generating comprises driving an electro-optical phase modulator at half a desired pulse frequency of said 90° AP optical pulsetrain.

10. The method as recited in claim 8 wherein said generating comprises exciting a modulated laser light source.

11. The method as recited in claim 8 wherein said 180° phase-shifting is carried out in an all-pass filter having at least one stage.

12. The method as recited in claim 8 wherein 180° phase-shifting is carried out in at least one Fabry-Perot filter.

13. The method as recited in claim 8 wherein 180° phase-shifting comprises 180° phase-shifting either said carrier band or at least two of said sidebands with an optical filter having a free spectral range at least three times a spacing of said carrier band and sidebands.

14. The method as recited in claim 8 wherein said 90° AP optical pulsetrain has a pulse frequency of about 40 GHz.

15. An apparatus for generating a 90° alternate phase (AP) optical pulsetrain, comprising:
   a phase-modulated optical signal generator including an electro-optical phase, said phase-modulated optical signal generator configured to generate a phase-modulated optical signal having a carrier band and sidebands phase-shifted relative thereto by multiples of 90°; and
   an optical filter coupled to said phase-modulated optical signal generator and configured to 180° phase-shift selected ones of said carrier band and sidebands to generate an 90° AP optical pulsetrain having a pulse frequency of about 40 GHz.

16. The apparatus as recited in claim 15 wherein said optical filter is an all-pass filter having at least one stage.

17. The apparatus as recited in claim 15 wherein said optical filter is at least one Fabry-Perot filter.

18. The apparatus as recited in claim 15 wherein said optical filter 180° phase-shifts either said carrier band or at least two of said sidebands.

19. The apparatus as recited in claim 15 wherein said optical filter has a free spectral range at least three times a spacing of said carrier band and sidebands.

20. The apparatus as recited in claim 15 wherein said optical filter comprises first and second stages having ring resonators.

* * * * *